(12) United States Patent
Youn

(10) Patent No.: US 12,347,851 B2
(45) Date of Patent: Jul. 1, 2025

(54) METHOD FOR MANUFACTURING ANODE FOR LITHIUM SECONDARY BATTERY

(71) Applicant: LG ENERGY SOLUTION, LTD., Seoul (KR)

(72) Inventor: Suk Il Youn, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 823 days.

(21) Appl. No.: 17/612,030

(22) PCT Filed: Aug. 25, 2020

(86) PCT No.: PCT/KR2020/011344
§ 371 (c)(1),
(2) Date: Nov. 17, 2021

(87) PCT Pub. No.: WO2021/045431
PCT Pub. Date: Mar. 11, 2021

(65) Prior Publication Data
US 2022/0223847 A1    Jul. 14, 2022

(30) Foreign Application Priority Data
Sep. 6, 2019  (KR) .................. 10-2019-0110716

(51) Int. Cl.
*H01M 4/38* (2006.01)
*H01M 4/04* (2006.01)
(Continued)

(52) U.S. Cl.
CPC ......... *H01M 4/382* (2013.01); *H01M 4/0423* (2013.01); *H01M 4/0435* (2013.01);
(Continued)

(58) Field of Classification Search
CPC .. H01M 4/382; H01M 4/0423; H01M 4/0435; H01M 4/366
(Continued)

(56) References Cited

U.S. PATENT DOCUMENTS

2005/0079420 A1    4/2005  Cho et al.
2009/0271961 A1    11/2009 Kondou et al.
(Continued)

FOREIGN PATENT DOCUMENTS

EP    3 540 828 A2    9/2019
EP    3 547 411 A1    10/2019
(Continued)

OTHER PUBLICATIONS

International Search Report (PCT/ISA/210) issued in PCT/KR2020/011344, dated Dec. 2, 2020.
(Continued)

*Primary Examiner* — Jonathan G Leong
*Assistant Examiner* — John S Medley
(74) *Attorney, Agent, or Firm* — Birch, Stewart, Kolasch & Birch, LLP

(57) ABSTRACT

A method for manufacturing an anode for a lithium secondary battery comprises: preparing a lithium transfer film by forming a lithium layer on a protection layer of a transfer film, wherein the transfer film includes a substrate and the protective layer; and preparing a negative electrode having a negative electrode active material layer formed on a current collector, and transferring the lithium transfer film by contacting and rolling the lithium transfer film onto the surface of the negative electrode material layer such that the lithium layer faces the negative electrode active material layer. The protective layer contains an acrylic resin, and the lithium layer and the protective layer are transferred onto the negative electrode active material layer.

7 Claims, 7 Drawing Sheets

(51) Int. Cl.
  *H01M 4/36* (2006.01)
  *H01M 10/0525* (2010.01)
  *H01M 4/02* (2006.01)

(52) U.S. Cl.
  CPC ....... *H01M 4/366* (2013.01); *H01M 10/0525* (2013.01); *H01M 2004/027* (2013.01)

(58) Field of Classification Search
  USPC ........................................................ 429/209
  See application file for complete search history.

(56) References Cited

U.S. PATENT DOCUMENTS

| | | | | |
|---|---|---|---|---|
| 2014/0272594 | A1* | 9/2014 | Safont Sempere | ... H01M 4/134 429/231.95 |
| 2016/0293943 | A1* | 10/2016 | Hu | ...................... H01M 10/052 |
| 2017/0062829 | A1* | 3/2017 | Ryu | ................. H01M 10/0569 |
| 2017/0317352 | A1 | 11/2017 | Lee et al. | |
| 2018/0294513 | A1* | 10/2018 | Hwang | ................. H01M 4/134 |
| 2019/0067702 | A1 | 2/2019 | Son et al. | |
| 2019/0074520 | A1* | 3/2019 | Woo | ........................ H01M 4/62 |
| 2019/0372101 | A1 | 12/2019 | Youn et al. | |
| 2020/0075939 | A1 | 3/2020 | Son et al. | |
| 2020/0274148 | A1 | 8/2020 | Youn et al. | |
| 2022/0131127 | A1* | 4/2022 | Xie | ..................... H01M 4/1395 |

FOREIGN PATENT DOCUMENTS

| | | | | |
|---|---|---|---|---|
| EP | 3 547 413 A1 | | 10/2019 | |
| JP | 10-289708 A | | 10/1998 | |
| JP | 2008-21901 A | | 1/2008 | |
| JP | 2012064336 A | * | 3/2012 | ............. Y02E 60/10 |
| JP | 2013-20974 A | | 1/2013 | |
| JP | 2013020974 A | * | 1/2013 | ............. Y02E 60/10 |
| JP | 2024058797 A | * | 4/2024 | ............. Y02E 60/10 |
| KR | 10-2005-0019483 A | | 3/2005 | |
| KR | 10-2015-0145046 A | | 12/2015 | |
| KR | 20170117649 A | * | 10/2017 | ........ H01M 10/0525 |
| KR | 10-2017-0124075 A | | 11/2017 | |
| KR | 10-2018-0119254 A | | 11/2018 | |
| KR | 10-2018-0124723 A | | 11/2018 | |
| KR | 10-2019-0011881 A | | 2/2019 | |
| WO | WO-2018131899 A1 | * | 7/2018 | .......... H01M 10/052 |
| WO | WO 2018/199505 A1 | | 11/2018 | |
| WO | WO 2019/022402 A2 | | 1/2019 | |
| WO | WO 2019/112278 A1 | | 6/2019 | |

OTHER PUBLICATIONS

Extended European Search Report for European Application No. 20860193.0, dated Jul. 5, 2022.

* cited by examiner

[FIG. 1]
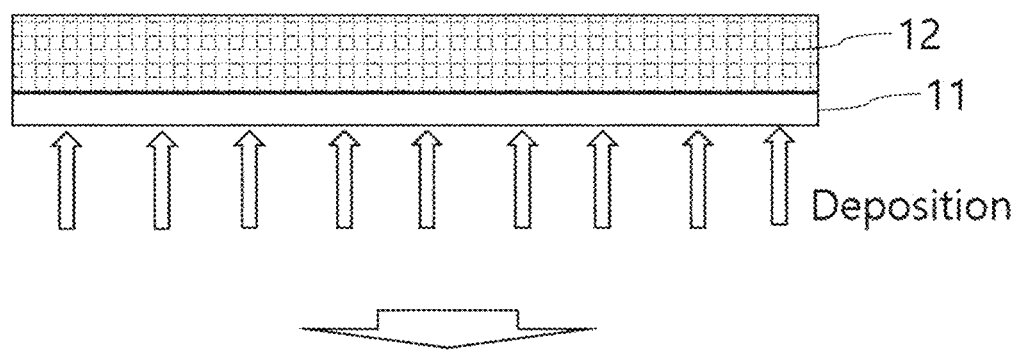
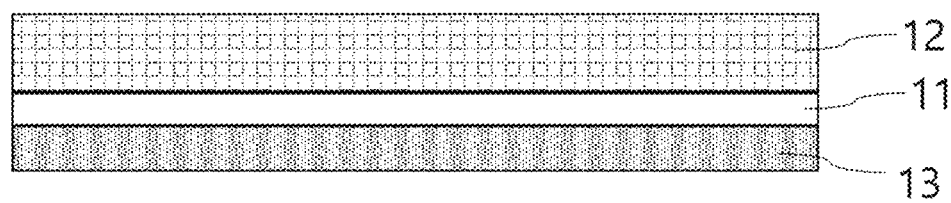

[FIG. 2]
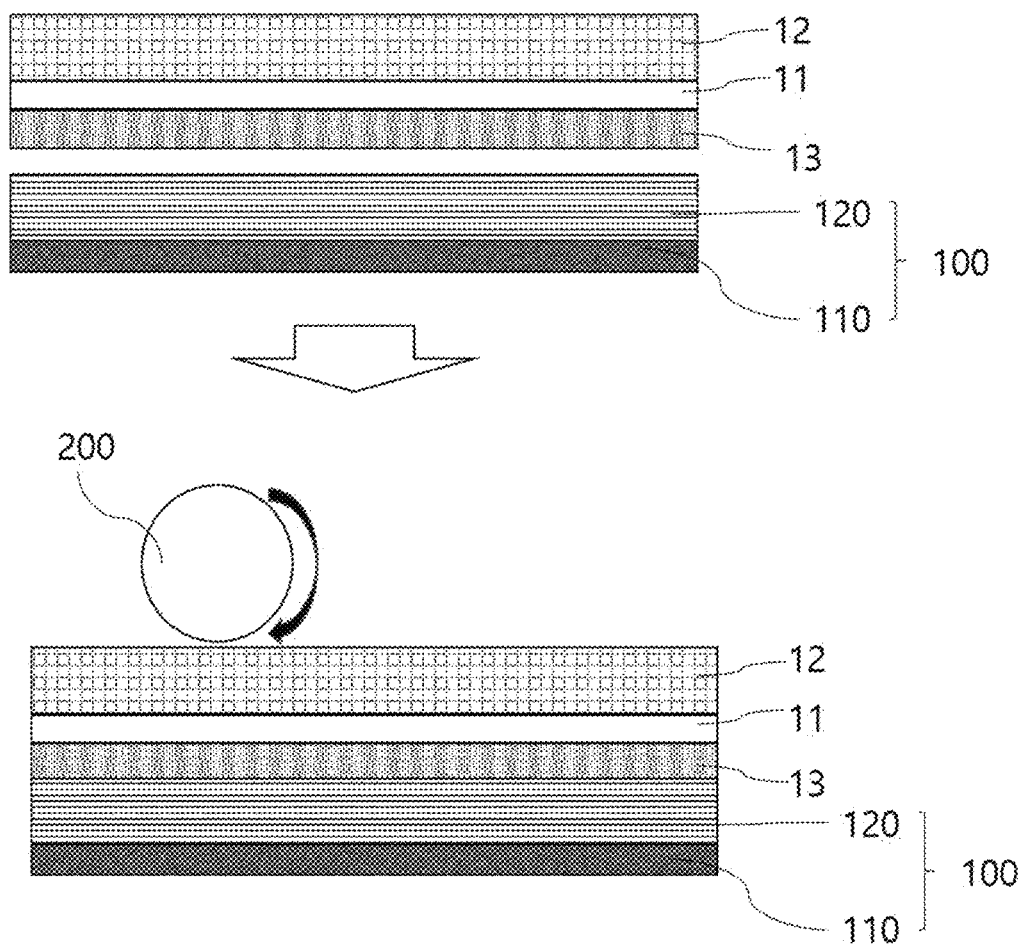

[FIG. 3]
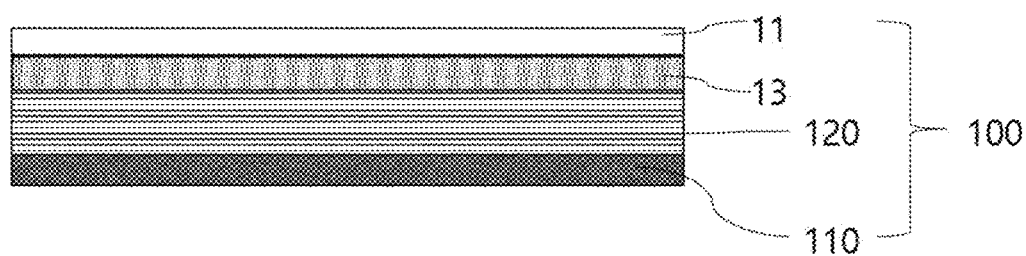

[FIG. 4]
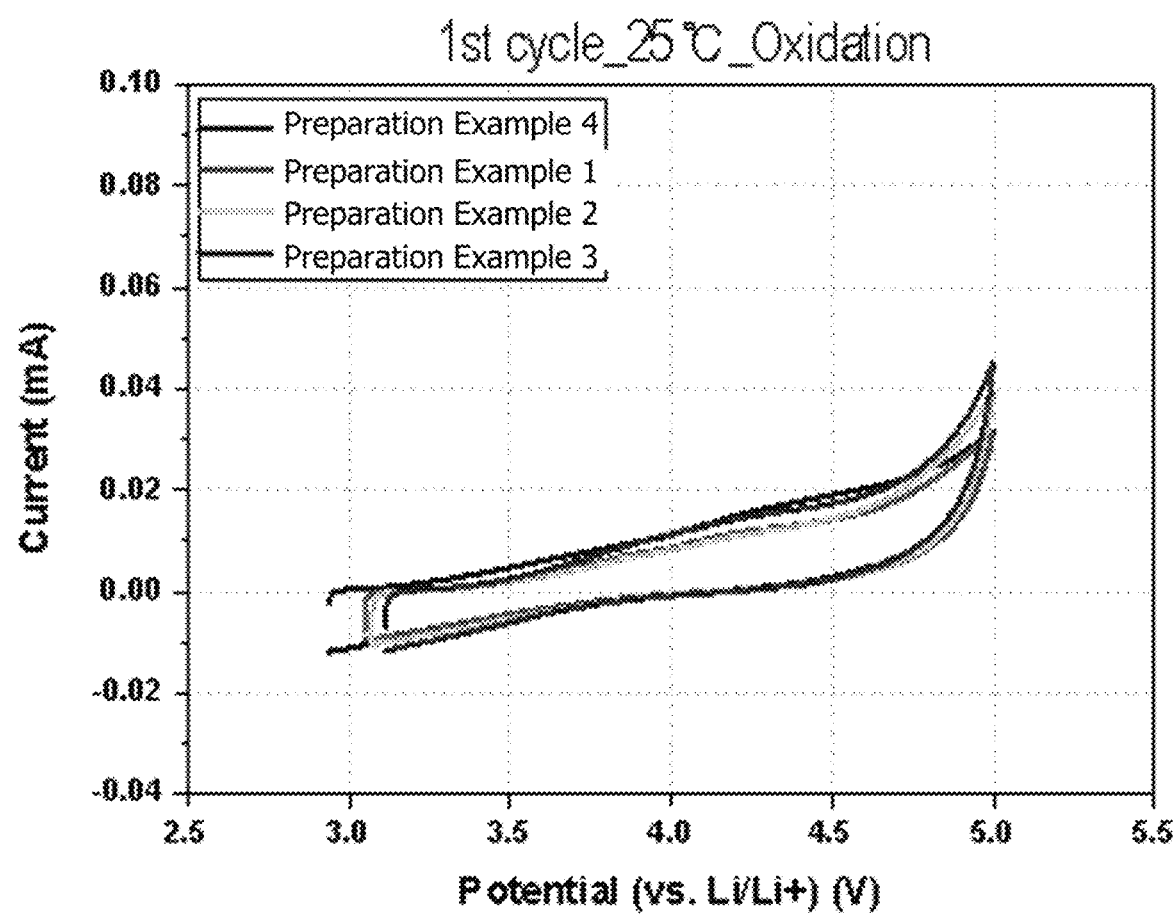

[FIG. 5]
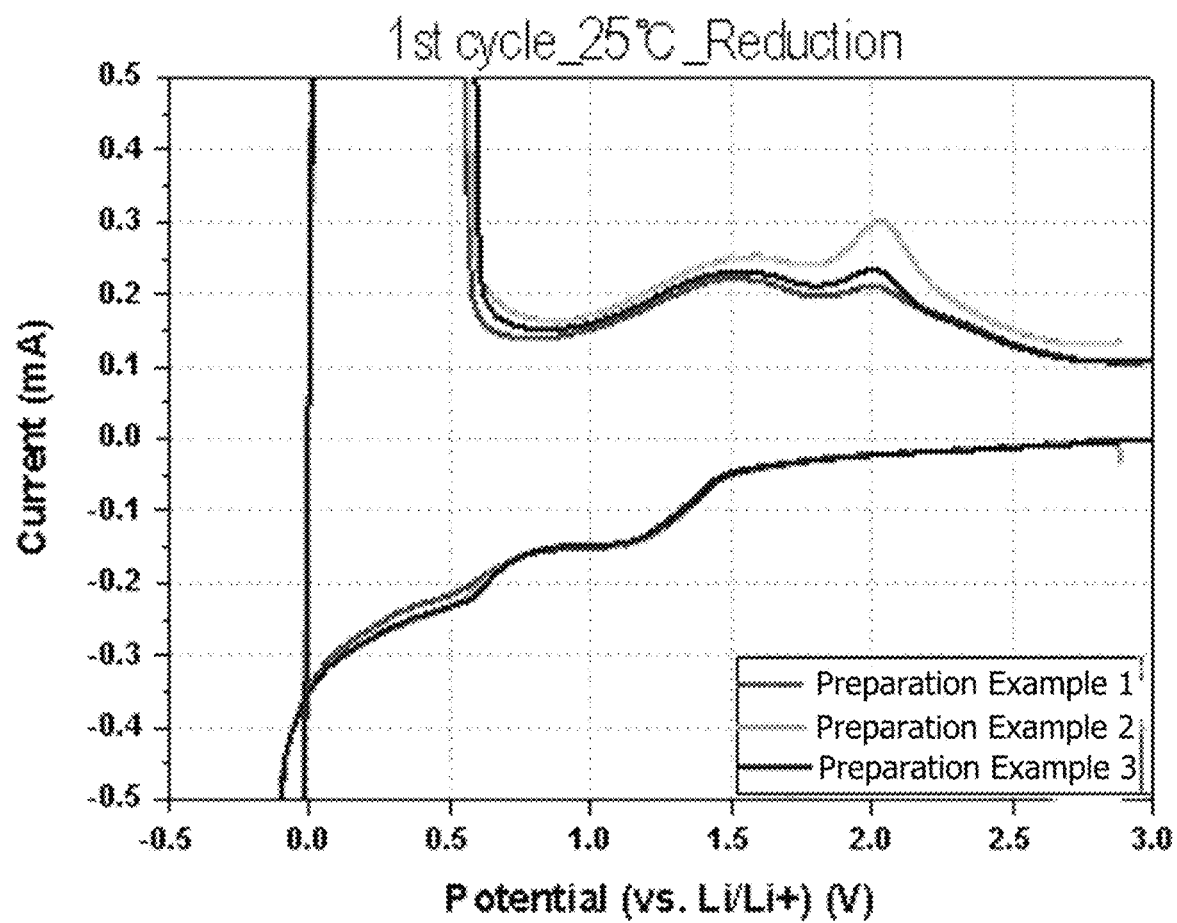

[FIG. 6]
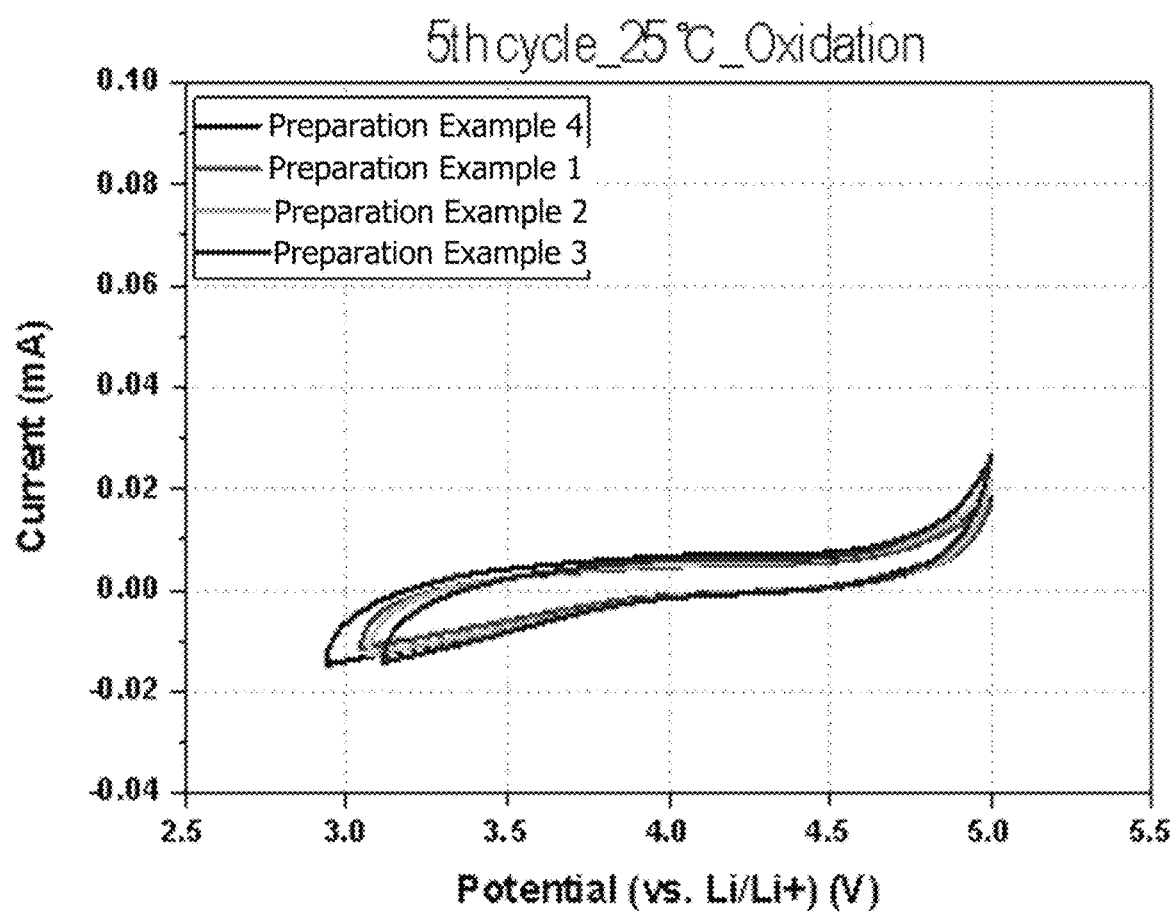

[FIG. 7]
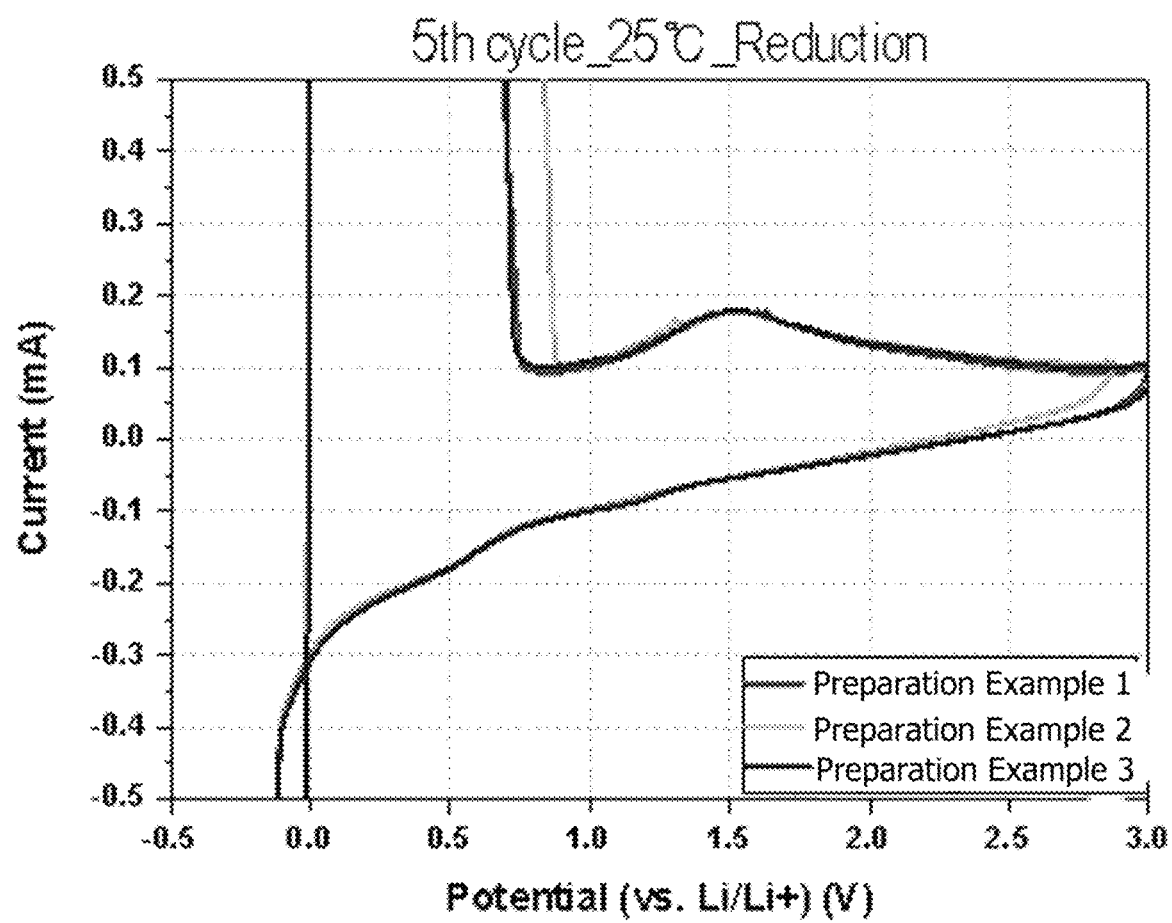

METHOD FOR MANUFACTURING ANODE FOR LITHIUM SECONDARY BATTERY

TECHNICAL FIELD

This application claims the benefit of priority based on Korean Patent Application No. 10-2019-0110716, filed on Sep. 6, 2019, and the entire contents of the Korean patent application are incorporated herein by reference.

The present invention relates to a negative electrode for a lithium secondary battery and a method of manufacturing the same.

BACKGROUND ART

In recent years, with the development and distribution of mobile devices, personal computers, electric motors, and temporary power storage devices, high-capacity energy sources are required, and a lithium secondary battery is a representative example thereof. As a negative electrode material for a next-generation nonaqueous electrolyte secondary battery, silicon (Si) having a capacity (4200 mAh/g) of 10 times or more of a conventional graphite-based material (theoretical capacity is 372 mAh/g) is attracting attention.

From this, it is proposed to use a metal oxide such as silicon oxide or tin oxide exhibiting a high theoretical capacity as a new material to replace the carbon-based material, as a negative electrode active material. However, such a metal oxide has a disadvantage in that a volume change occurs during charging and discharging, and cracking and deterioration of the active material occurs, thereby reducing the cycle life.

On the other hand, pre-lithiation technology in which lithium is pre-inserted into a metal oxide is being attempted. As an example of such a prelithiation technology, conventionally, a lithium metal thin film was transferred (laminated) to the surface of the negative electrode active material layer to produce an electrode assembly, and then an electrolyte solution was injected to diffuse the lithium into the negative electrode active material layer, to thereby be pre-lithiated.

The above prelithiation method has a problem in that it is difficult to peel lithium from the support when lithium is applied to the negative electrode active material layer by transfer after forming the lithium metal on the support.

Japanese Patent Laid-Open No. 2013-020974 discloses a technology capable of easily transferring a lithium metal thin film onto a negative electrode active material layer of a negative electrode for a secondary battery. The technology includes a process in which an auxiliary layer having a lower reactivity to the release layer than lithium is formed on the release layer, and a transfer film prepared by depositing lithium on the auxiliary layer is transferred to a negative electrode to transfer the auxiliary layer and the lithium layer. However, since the above technology applies a metal such as copper, aluminum, or nickel or a metal oxide as an auxiliary layer, the auxiliary layer remaining in the negative electrode after assembly of the battery acts as a resistance.

Accordingly, in transferring lithium metal onto the negative electrode active material layer, it is necessary to develop a technology that does not increase the resistance of the battery while easily peeling lithium from the support.

DISCLOSURE

Technical Problem

An object of the present invention is to provide a method for not increasing the resistance of a battery while easily peeling lithium from a support, in transferring lithium metal onto a negative electrode active material layer.

Technical Solution

The method of manufacturing a negative electrode for a secondary battery of the present invention for solving the above technical problem includes: a step of preparing a lithium transfer film by forming a lithium layer on a protective layer of a transfer film, wherein the transfer film includes a substrate and a protective layer; and a transfer step of preparing a negative electrode having a negative electrode active material layer formed on a current collector, and transferring the lithium transfer film by contacting and rolling the lithium transfer film onto the surface of the negative electrode material layer so that the lithium layer faces the negative electrode active material layer, wherein the protective layer includes an acrylic resin, and in the transfer step, the lithium layer and the protective layer are transferred onto the negative electrode active material layer.

In an embodiment of the present invention, the acrylic resin is a polymer consisting of one or more monomer unit selected from the group consisting of methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, n-hexyl methacrylate, and lauryl methacrylate, or the acrylic resin is a copolymer consisting of two or more monomer units selected from the group consisting of methyl acrylate, ethyl acrylate, isopropyl acrylate, n-butyl acrylate 2-ethylhexyl acrylate, methyl methacrylate, ethyl methacrylate, isopropyl methacrylate, n-butyl methacrylate, isobutyl methacrylate, n-hexyl methacrylate, and lauryl methacrylate.

In an embodiment of the present invention, a thickness of the protective layer of the transfer film may be 0.01 μm to 5 μm.

In an embodiment of the present invention, the transfer film further comprises a release layer may be interposed between the substrate and the protective layer of the transfer film.

Herein, the release layer may include at least one selected from the group consisting of silicone-modified polyester, Si, melamine and fluorine, wherein the silicone-modified polyester comprises a silicone chain graft-bonded to a polyester main chain.

In an embodiment of the present invention, in the step of preparing the lithium transfer film, the lithium layer may be deposited and formed by one method selected from the group consisting of thermal evaporation deposition, evaporation deposition, chemical deposition, chemical vapor deposition (CVD), and physical vapor deposition.

In an embodiment of the present invention, in the step of preparing the lithium transfer film, a thickness of the lithium layer is preferably 0.01 μm to 20 μm.

In an embodiment of the present invention, the method further includes a step of removing the substrate after transferring the lithium transfer film onto the surface of the negative electrode active material layer.

In an embodiment of the present invention, the lithium layer may have a pattern by depositing the lithium layer using a pattern mask.

The negative electrode for a secondary battery of the present invention manufactured by the above method has a characteristic that the acrylic resin layer does not act as a resistance.

Advantageous Effects

According to the method of manufacturing a negative electrode for a lithium secondary battery of the present invention, a lithium layer can be easily peeled off from a substrate layer.

In addition, the lithium layer and the protective layer protecting the lithium layer from the atmosphere or water vapor are also transferred to the negative electrode, thereby minimizing the loss of lithium.

In addition, since the protective layer does not act as a resistor after assembling the secondary battery, there is an effect of providing a secondary battery having excellent electrical performance and capacity.

BRIEF DESCRIPTION OF THE DRAWINGS

FIG. 1 is a schematic diagram showing a step of preparing a lithium transfer film for forming a lithium layer on a transfer film.

FIG. 2 is a schematic diagram showing a step of transferring a lithium layer and a protective layer onto a negative electrode active material layer.

FIG. 3 is a cross-sectional view of a negative electrode for a lithium secondary battery manufactured according to the manufacturing method of the present invention.

FIGS. 4 to 7 are graphs showing experimental results by cyclic voltammetry for checking resistance by an electrolyte solution containing an acrylic resin included in the protective layer of the present invention.

DETAILED DESCRIPTION OF THE PREFERRED EMBODIMENTS

The terms and words used in the present specification and claims should not be construed as limited to ordinary or dictionary terms and the inventor may properly define the concept of the terms in order to best describe its invention. The terms and words should be construed as meaning and concept consistent with the technical idea of the present invention. Accordingly, the embodiments described in the specification and the configurations described in the drawings are only the most preferred embodiments of the present invention, and do not represent all of the technical ideas of the present invention. It is to be understood that there may be various equivalents and variations in place of them at the time of filing the present application.

Hereinafter, the present invention will be described in detail.

A method of manufacturing a negative electrode for a secondary battery of the present invention includes: a step of preparing a lithium transfer film by forming a lithium layer on a protective layer of a transfer film including a substrate and a protective layer; and a transfer step of preparing a negative electrode in which a negative electrode active material layer is formed on a current collector, and bonding and rolling the lithium transfer film so that the lithium layer faces on the negative electrode active material layer, wherein the protective layer includes an acrylic resin, and in the transfer step, the lithium layer and the protective layer are transferred onto the negative electrode active material layer.

The inventors of the present invention have found that when the protective layer of the lithium transfer film contains an acrylic resin, the substrate is easily peeled off after the transfer of the lithium layer and the protective layer, so that surprisingly, the acrylic resin remaining as a protective layer does not act as the resistance of the battery while minimizing the loss of lithium, and have reached the present invention.

FIG. 1 shows a step of preparing a film for lithium transfer. Referring to FIG. 1, the step of preparing the lithium transfer film of the present invention includes preparing a transfer film including a substrate 12 and a protective layer 11 and forming a lithium layer 13 by depositing lithium on the protective layer 11.

The substrate may have characteristics of being able to withstand process conditions such as high temperature in the step of depositing lithium metal, and prevent the reverse peeling problem in which the lithium layer is transferred onto the substrate during a winding process for transferring the deposited lithium layer.

For example, the substrate may be one or more selected from the group consisting of polyethylene terephthalate (PET), polyimide (PI), polymethylmethacrylate (PMMA), polypropylene, polyethylene and polycarbonate.

In addition, the substrate may have a release layer formed on at least one side, and may have a release layer formed on both sides. Since the substrate has a the release layer, it is possible to prevent the reverse peeling problem in which the lithium layer is transferred onto the substrate during the winding process for transferring the deposited lithium layer to the negative electrode, and after transferring the lithium layer and the protective layer onto the negative electrode active material layer, the substrate can be easily separated. When a release layer is formed on one side of the substrate, the release layer is interposed between the substrate and a protective layer to be described later.

The release layer may include at least one selected from the group consisting of silicone-modified polyester in which a silicone chain is graft-bonded to a polyester main chain, Si, melamine and fluorine.

The release layer may be formed by a coating method. Herein, for example, the coating method may be a method selected from the group consisting of dip coating, spray coating, spin coating, die coating, gravure coating, microgravure coating, comma coating and roll coating, but this is not limited thereto, and various coating methods that can be used to form a coating layer in the art may be used.

The protective layer constituting the transfer film of the present invention is characterized in that it contains an acrylic polymer resin. The protective layer has an advantage of reducing the loss of highly reactive lithium by blocking the lithium layer from air or water vapor after transfer.

The acrylic resin may be a polymer including one or more repeating units selected from the group consisting of acrylate-based repeating units and methacrylate-based repeating units. Specifically, the acrylic resin may be a polymer consisting of one or more monomers selected from the group consisting of methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, n-hexyl methacrylate and lauryl methacrylate, or a copolymer consisting of two or more monomers selected from the group.

In addition, the methacrylate-based repeating unit may be a methacrylate repeating unit having an aromatic ring. Further, the methacrylate repeating unit having an aromatic ring may include, for example, repeating units derived from methacrylate containing an aromatic ring having 6 to 12 carbon atoms, and specifically, phenyl methacrylate, benzyl methacrylate, etc.

Further, the acrylic resin may further include one or more repeating units selected from the group consisting of aromatic vinyl-based repeating units; imide-based repeating units; vinyl cyanide-based repeating units; and 3-membered to 6-membered heterocyclic repeating units substituted with at least one carbonyl group.

The protective layer may further include a release agent in addition to the acrylic resin. At this time, the content ratio of the acrylic resin in the protective layer may be 99.9 to 99.99% by weight, preferably 99.92 to 99.98% by weight, and more preferably 99.94 to 99.96% by weight, based on the total weight of the protective layer. If the content ratio of the acrylic resin in the protective layer is less than 99.9% by weight, the protective function for lithium metal may be deteriorated, and if it exceeds 99.99% by weight, the content of the acidic release agent may be relatively reduced, and thus the releasability may decrease during the manufacturing process. When a release agent is included in the protective layer itself, it can function as a release layer when removing the substrate included in the transfer film as well as the protective layer function for lithium metal, so a separate release layer as described above will not be necessary in the transfer film.

In addition, the release agent is preferably an acid release agent, and one or more selected from the group consisting of fatty acid, stearic acid, palmitic acid and oleic acid may be used as the acid release agent, and preferably the fatty acid may be used as the acid release agent.

The content of the acidic release agent contained in the protective layer may include 0.01 to 0.1% by weight, preferably 0.03 to 0.9% by weight, more preferably 0.05 to 0.8% by weight.

The thickness of the protective layer is preferably 0.01 to 5 μm. If the thickness of the protective layer exceeds 5 μm, the protective layer may act as a resistance in the battery, and heat transfer may not be easy in the thermal evaporation process of lithium. Further, forming the thickness of the protective layer to less than 0.01 μm is difficult due to a limitation in the coating technology.

The protective layer may be formed by a coating method. Herein, for example, the coating method may be a method selected from the group consisting of dip coating, spray coating, spin coating, die coating, gravure coating, microgravure coating, comma coating and roll coating, but this is not limited thereto, and various coating methods that can be used to form a coating layer in the art may be used.

The thickness of the transfer film including the substrate and the protective layer may be 2 to 100 μm.

Lithium may be deposited on the protective layer 11 to form a lithium layer on the transfer film. The deposition method for depositing lithium may be selected from evaporation deposition, chemical vapor deposition (CVD), and physical vapor deposition, but it is not limited thereto, and various vapor deposition methods used in the art may be used.

In the present invention, the lithium layer formed on the protective layer by vapor deposition may have a thickness of 0.01 μm to 20 μm. The thickness of the lithium layer may vary depending on the irreversible capacity to be compensated and the type of negative electrode active material.

In an embodiment of the present invention, a pattern may be formed in the process of depositing lithium in order to improve impregnation property of the negative electrode with the electrolyte solution. A method of forming a pattern in the process of depositing lithium may be performed by a method of raising a pattern mask on the protective layer and performing a deposition process. At this time, the pattern mask has a through hole according to the pattern, and when deposition is performed after the pattern mask is placed on the protective layer, lithium can be deposited only through the through hole on the protective layer, so that a lithium layer having a pattern can be easily formed.

FIG. 2 is a schematic diagram showing a transfer step, and referring to FIG. 2, first, a negative electrode 100, on which a negative electrode active material layer 120 is formed on the current collector 110, is prepared, and the lithium transfer film is bonded so that the lithium layer 13 faces the negative electrode active material layer 120 of the negative electrode 100. Thereafter, by heating and pressing the laminate of the negative electrode 100 and the lithium transfer film with a rolling means such as a rolling roller 200 to perform rolling, the lithium layer 13 and the protective layer of the lithium transfer film 11 is transferred onto the negative electrode 100.

The rolling process may be performed according to a known method. This rolling process involves heating/pressing the lithium layer, the protective layer, and the negative electrode, and as a heating method for this, an indirect heating method by radiation and convection may be used.

The heating temperature is 20 to 150° C., preferably 40 to 130° C., and more preferably 60 to 110° C. If the temperature is less than 20° C., the time to reach the transfer temperature may be lengthened, and if it exceeds 150° C., cell performance may be deteriorated due to shrinkage of the base film.

After the transfer step, a step of peeling the substrate is performed. At this time, the substrate is removed, and the lithium layer and the protective layer remain on the negative electrode active material layer. FIG. 3 shows a negative electrode in which a lithium layer and a protective layer are formed by peeling the substrate. As described above, the negative electrode for a secondary battery of the present invention has an advantage that the acrylic resin does not act as a resistance even though the acrylic resin of the protective layer remains.

In order to confirm that the acrylic protective layer of the present invention does not act as a resistance, the following experiment was performed.

Preparation Example 1

An electrolyte, in which 1M $LiPF_6$ was added to a mixed solvent which is generated by mixing EC (ethylene carbonate) and EMC (ethyl methyl carbonate) by the ratio of 3:7, was prepared, and 0.1 wt % of a copolymer having methyl acrylate and n-butyl acrylate was added to the electrolyte solution to thereby be completely dissolved.

A coin-type trielectrode cell was prepared in which a 20 μm-thick lithium metal (Honzo Co., Ltd.) was used as a counter electrode and a reference electrode, and a stainless steel plate was applied as a working electrode. At this time, porous polyethylene was applied as the separator, and after assembling the coin-type trielectrode cell, the electrolyte solution was injected.

Preparation Example 2

A trielectrode cell was manufactured in the same manner as in Preparation Example 1, except that 0.5 wt % of a copolymer having methyl acrylate and n-butyl acrylate was added to the electrolyte solution.

Preparation Example 3

A trielectrode cell was manufactured in the same manner as in Preparation Example 1, except that 1.0 wt % of a copolymer having methyl acrylate and n-butyl acrylate was added to the electrolyte solution.

Preparation Example 4

A trielectrode cell was manufactured in the same manner as in Preparation Example 1, except that a copolymer having methyl acrylate and n-butyl acrylate was not added to the electrolyte solution.

Experimental Example 1

The trielectrode cell of Preparation Examples 1 to 4 was charged and discharged at a rate of 10 mV per second in a Potentiostat equipment, and the change of the current with respect to the voltage was observed according to cyclic voltammetry. Current-voltage diagrams of the oxidation/reduction reaction in the first cycle are shown in FIGS. 4 and 5, and current-voltage diagrams of the oxidation/reduction reaction in the fifth cycle are shown in FIGS. 6 and 7, respectively.

Referring to FIGS. 4 to 7, when compared with the electrolyte solution of Preparation Example 4 in which no acrylic polymer resin was added, no special peak was observed. From these results, it was confirmed that the acrylic resin, which is a material for the protective layer of the present invention, has an effect of not acting as a resistance of the battery.

Example 1

A transfer film (manufacturer: I-One Film) coated with 1 μm of an acrylic resin on a polyethylene terephthalate substrate was prepared. Lithium was deposited on the acrylic resin coating layer of the transfer film by a thermal evaporation method to form a 5 μm-thick lithium layer to thereby prepare a lithium transfer film. At this time, the evaporation device was EWK-060 of ULVAC Co., Ltd., the speed was set to 2.5 m/min, the temperature of the lithium supply part was set to 500° C., and the temperature of the main roll was set to −25° C. for the evaporation process.

A negative electrode prepared by applying a negative electrode active material layer made of pure silicon on a copper current collector was prepared. The lithium layer of the lithium transfer film was bonded to face each other, on the negative electrode active material layer of the negative electrode, followed by rolling, and the polyethylene terephthalate substrate was removed. As a result, a negative electrode to which the lithium layer and the acrylic resin layer were transferred was prepared.

After punching the negative electrode, to which the lithium layer has been transferred, into a size of 34 mm in width and 51 mm in length, a porous polyethylene separator was interposed between the positive electrode including $Li(Ni_{0.8}Co_{0.1}Mn_{0.1})O_2$ as a positive electrode active material, to thereby prepare monocells.

Example 2

A monocell was manufactured in the same manner as in Example 1, except that the lithium layer was transferred using a transfer film coated with an acrylic resin of 0.5 μm on a polyethylene terephthalate substrate.

Comparative Example

A monocell was manufactured in the same manner as in Example 1, except that the negative electrode including the negative electrode active material layer as in Example 1 was applied as a negative electrode without transferring the lithium layer.

Experimental Example 2

The monocells prepared in Examples 1 and 2 and Comparative Examples were subjected to a HPPC (Hybrid Pulse Power Characterization) experiment in a charge-discharge device (manufacturer: PNESOLUTION) to compare the resistances of these monocells. As a result, it was confirmed that the monocells of Examples 1 and 2 had little difference from the resistance of the silicon electrode used in the comparative example.

Experimental Example 3

The monocells each prepared in Examples 1 and 2 and Comparative Examples were subjected to a charge/discharge experiment (4.2 to 2.5V) in a charge/discharge device (manufacturer: PNESOLUTION), and the capacity was measured. As a result, it was confirmed that the monocell capacity of Examples 1 and 2 was significantly increased than that of Comparative Example. From this, it can be seen that the transferred lithium layer as in Example 1 and 2 compensated for the initial irreversibility of the silicon negative electrode and contributed to the increase in capacity.

The invention claimed is:

1. A method of manufacturing a negative electrode for a lithium secondary battery, the method comprising:
preparing a lithium transfer film by forming a lithium layer on a protective layer of a transfer film, wherein the transfer film comprises a substrate and the protective layer;
preparing a negative electrode having a negative electrode active material layer formed on a current collector; and
transferring the lithium transfer film by contacting and rolling the lithium transfer film onto a surface of the negative electrode active material layer so that the lithium layer faces the negative electrode active material layer,
wherein the protective layer comprises an acrylic resin,
when transferring the lithium transfer film, the lithium layer and the protective layer are transferred onto the negative electrode active material layer,
wherein the substrate is one or more selected from the group consisting of polyethylene terephthalate (PET), polyimide (PI), polymethylmethacrylate (PMMA), polypropylene, polyethylene and polycarbonate,
wherein a thickness of the lithium layer is 0.01 to 20 μm,
wherein when preparing the lithium transfer film, the lithium layer is deposited and formed by one method selected from the group consisting of thermal evaporation deposition, evaporation deposition, chemical deposition, chemical vapor deposition (CVD), and physical vapor deposition, and
wherein the lithium layer has a pattern by depositing the lithium layer using a pattern mask.

2. The method of claim 1, wherein the acrylic resin is a polymer consisting of one or more monomer units selected from the group consisting of methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, n-hexyl methacrylate, and lauryl methacrylate.

3. The method of claim 1, wherein a thickness of the protective layer of the transfer film is 0.01 μm to 5 μm.

4. The method of claim 1, wherein the transfer film further comprises a release layer interposed between the substrate and the protective layer.

5. The method of claim 4, wherein the release layer includes one or more selected from the group consisting of silicone-modified polyester, silicone, melamine and fluorine,
   wherein the silicone-modified polyester comprises a silicone chain graft-bonded to a polyester main chain.

6. The method of claim 1, further comprising:
   a step of removing the substrate after transferring the lithium transfer film onto the surface of the negative electrode active material layer.

7. The method of claim 1, wherein the acrylic resin is a copolymer consisting of two or more monomer units selected from the group consisting of methyl acrylate, ethyl acrylate, isopropyl acrylate, n-butyl acrylate, 2-ethylhexyl acrylate, methyl methacrylate, ethyl methacrylate, isopropyl methacrylate, n-butyl methacrylate, isobutyl methacrylate, n-hexyl methacrylate, and lauryl methacrylate.

\* \* \* \* \*